United States Patent
Kirpichnikov

(10) Patent No.: US 10,479,457 B2
(45) Date of Patent: Nov. 19, 2019

(54) SMALL FLAT-BOTTOMED FLOATING CRAFT, PREFERABLY SWIMMING BOARD CONFIGURED TO OBSERVE UNDERWATER SPACE

(71) Applicant: AUTEX LTD., Moscow (RU)

(72) Inventor: Alexei Petrovich Kirpichnikov, Moscow (RU)

(73) Assignee: AUTEX LTD., Moscow (RU)

( * ) Notice: Subject to any disclaimer, the term of this patent is extended or adjusted under 35 U.S.C. 154(b) by 0 days.

(21) Appl. No.: 15/556,257

(22) PCT Filed: Mar. 9, 2016

(86) PCT No.: PCT/RU2016/000125
§ 371 (c)(1),
(2) Date: Sep. 6, 2017

(87) PCT Pub. No.: WO2016/144208
PCT Pub. Date: Sep. 15, 2016

(65) Prior Publication Data
US 2018/0050766 A1    Feb. 22, 2018

(30) Foreign Application Priority Data
Mar. 10, 2015   (RU) .............................. 2015108148

(51) Int. Cl.
*B63B 35/79*       (2006.01)
*B63C 11/49*       (2006.01)
(Continued)

(52) U.S. Cl.
CPC .............. *B63B 35/79* (2013.01); *B63B 35/58* (2013.01); *B63B 35/7933* (2013.01);
(Continued)

(58) Field of Classification Search
CPC ..... B63B 35/79; B63B 35/7933; B63B 35/58; B63B 35/81; B63C 11/49; Y02A 30/35
See application file for complete search history.

(56) References Cited

U.S. PATENT DOCUMENTS 7,507,132 B2 * 3/2009 Grune ................. B63B 35/7906
114/66
7,731,554 B2 * 6/2010 Grune ................. B63B 35/7906
119/220
(Continued)

FOREIGN PATENT DOCUMENTS

CN    202905052 U   4/2013
FR    2965790 A1    4/2012
(Continued)

OTHER PUBLICATIONS http://www.pro-israel.ru/podvodnaya-observatoriya.html.
(Continued)

*Primary Examiner* — Anthony D Wiest
(74) *Attorney, Agent, or Firm* — Notaro, Michalos & Zaccaria P.C.

(57) ABSTRACT

Use: in building of light, predominantly individual sports and tourist floating craft. Essence of the invention: the display on the surface of the swimming board or surfboard broadcasts the information received both from video cameras located either on the surface of the floating craft or on the supports or pulled in tow under the water, and from external mobile and other devices. The display is configured to stabilize the displayed image and compensate effects caused by water refraction coefficient, and has the ability of creating animated graphic marks and tips to facilitate user's balancing on the floating craft.

15 Claims, 3 Drawing Sheets

(51) Int. Cl.
  *B63B 35/81* (2006.01)
  *B63B 35/58* (2006.01)
(52) U.S. Cl.
  CPC .............. *B63B 35/81* (2013.01); *B63C 11/49* (2013.01); *Y02A 30/35* (2018.01)

(56) References Cited

U.S. PATENT DOCUMENTS

| | | | |
|---|---|---|---|
| 9,738,355 B1* | 8/2017 | Thorson | B63B 35/71 |
| 2005/0064774 A1 | 3/2005 | Grune | |
| 2011/0142281 A1* | 6/2011 | He | G01O 23/00 |
| | | | 382/103 |
| 2016/0257383 A1* | 9/2016 | Masson | B63C 11/49 |

FOREIGN PATENT DOCUMENTS

| | | |
|---|---|---|
| KR | 100977589 B1 | 8/2010 |
| WO | 2013182523 A1 | 12/2013 |

OTHER PUBLICATIONS

International Search Report and Written Opinion for corresponding PCT application No. PCT/RU2016/000125, dated Jul. 26, 2016.

\* cited by examiner

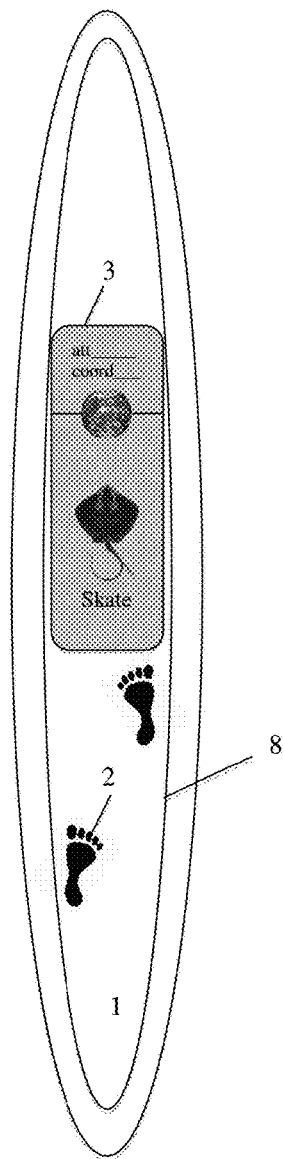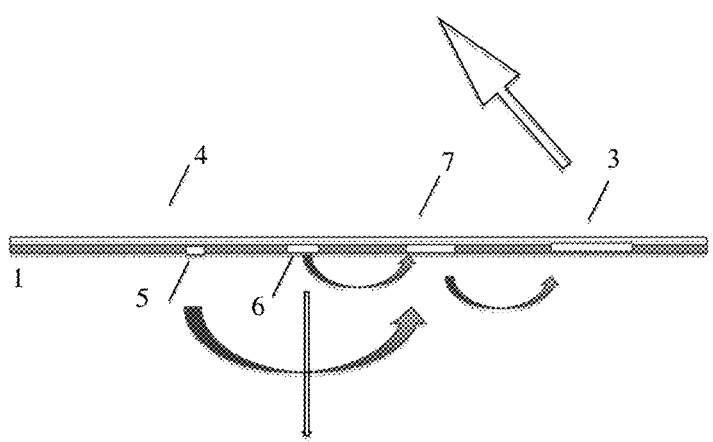
Fig.1
Fig.2

SMALL FLAT-BOTTOMED FLOATING CRAFT, PREFERABLY SWIMMING BOARD CONFIGURED TO OBSERVE UNDERWATER SPACE

FIELD OF THE INVENTION

The present invention relates to tourist and sports equipment and may be used in building of light (small) floating craft, including swimming boards, SUP boards, surfboards, kayaks, inflatable boats, etc.

BACKGROUND OF THE INVENTION

It is known that displays can be used in floor coverings (this is disclosed in the utility model CN202905052 (U), G09F9/33, 24 Apr. 2013, comprising a housing whose upper part is formed by information screen, or in the patent KR100977589, G09F7/18, 23 Aug. 2010 comprising a base, a support plate and a transparent plate located on the electric module).

A transparent deck of a floating craft has also been described. For example, the article on the website http://www.pro-isreal.ru/podvodnaya-observatoriya.html describes the ship "Coral 2000" which has a transparent deck at 1.5 m below the water surface that provides convenient observation of the world of the Red Sea.

The disadvantages of the above mentioned implementations are, first, inability to combine underwater observing with information exchange and, second, passive observation which significantly limits accuracy of information obtained by the observer.

In addition, when a user, a tourist or a sportsman, is on a small flat-bottomed floating craft, especially when he/she balances on a surfboard, board or canoe, reading of information from mobile devices (tablet, smartphone) becomes dangerous. The user's vestibular apparatus constantly readjusts, his/her vision switches from a screen to water surface and back and the user can fall or drop the gadget.

The closest analogue to the invention claimed is disclosed in the patent US20050064774, B63B 1/00, 24 Mar. 2005 describing a small floating craft, a swimming board made transparent to observe the undersea world. This swimming board is equipped with a radar which indicates the location of large undersea objects on its screen.

The main disadvantage of the apparatus mentioned above is the inability to overlap the processes of "balancing", reading information and observing the undersea world. When a user is on a small flat-bottomed floating craft, especially when he/she balances on a surfboard, reading of information from mobile devices becomes dangerous as the user's vestibular apparatus constantly readjusts, and his/her vision switches from a screen to water surface and back. This happens when the user tries to combine just two processes (balancing and reading), not to mention watching objects and dwellers of the undersea world, etc.

SUMMARY OF THE INVENTION

The present invention is aimed to improve safety and usability of floating crafts by secure reading of information (navigational, environmental and other), to increase completeness and correctness of information, and to decrease time of its access. Furthermore, it aims to assist the user to control the floating craft by ensuring the following factors simultaneously:

processing the information obtained in the course of observation, including video surveillance of water layers, bottom and surrounding space;

recognizing the observed objects and displaying information about them as well as presenting weather report, messages from the Coast Guard, other users, mobile devices, etc.;

tracking the current position of the floating craft, both the angular one (that is rolling, intentional tilt, wave, etc.) and its coordinates;

assistance in balancing and control (including training).

The goal of the present invention is to provide the user with all available useful information without hampering the user's visual system needed to control the process of balancing on an unstable floating craft. It imposes additional requirements on a displayed image and its location which must be accessible to the user's central and peripheral vision assisting him/her and not diverting from movement. (For example, for the user looking forward and down such a zone is located at the user's feet and a little ahead.) In addition, it is desirable to have customized topology adjustment of displayed information.

The abovementioned result is achieved by the fact that the small flat-bottomed floating craft, predominantly a surfboard, SUP board, swimming board or boat, configured with ability to observe underwater space and underwater objects using the surface of the floating craft which faces the user and serves him/her as a support, characterized in that there is an information display mounted in a central zone of the said surface where the user has to look to maintain balance while moving, wherein the display is configured with ability to display complex information from underwater means of video surveillance and image processing of underwater space and underwater objects and from the means of information processing from a group of primary converters, wherein the group of primary converters comprises at least an external data receiver and a converter of a tilt of the floating craft's surface that serves a user as a support from the horizontal plane, and the corresponding means of information processing are configured with apparent stabilization of individual image elements on the display relative to the horizontal plane.

Furthermore, the perimeter of the display and the perimeter of the floating craft may coincide, or the shape of the display may replicate the shape of the floating craft, but reduced in size.

This means that the display can occupy entire surface of the floating craft, especially the area under and in front of the user, which provides more outputting information and simplifies its reading by zooming. Furthermore, the recommended position of the user's feet and their movement for a better balance can be indicated on the surface of such display in a training mode.

Moreover, the possibility of observing can be provided by video devices wholly or partially located on or near the floating craft. This means that either the floating craft has a mount for a video camera or the camera is placed on a float and flexibly connected with the floating craft which also has a mount that for a display. This can be a display with reception, data processing and/or observation means. In this case an appropriate niche for a video camera or locator directed to the bottom should be provided on the floating craft. The display (or a display with reception, data processing and/or observation means) located in a hull can be provided with a mount configured to be set on the floating craft, for example, in the form of a flexible band.

Thus, a significant advantage of the claimed solution is that, unlike prior water sports boards, surfboards and other individual flat bottomed floating craft, the user observes the objects around and under him not directly, but by an image transmitted from the surveillance means to a display. As a particular case, such surveillance means may be installed on the surface of the floating craft facing the water or on a float pulled in tow behind the floating craft. More generally, they may be located on the bottom, on the shore, on another floating craft, etc. The display is mounted so that the user can read the image while moving and interact with it, as will be shown below. This happens, for example, if the floating craft comprises the extra mounted camera pointed at the user, and the data processing means recognize and react to certain movements of the user's hands, for example, scrolling which allows moving from one menu item to another. Therefore it is essential that the floating craft comprises the display and the video recorder pointed at the observed objects, as well as image transmitting and processing means situated between the video recorder and the display specially located to provide reading of information for the user.

Receivers and/or data processing means may also be wholly or partially located on the floating craft. This means that some of the receivers and/or data processing units may be located outside the floating craft and connect with the respective devices on the floating craft via Internet, radio channel, etc. Methods of spacing of the described scheme are widely known.

In addition, video surveillance and data processing means may be configured to compensate for image distortions on the display induced by water on the screen surface, by a deflection of vertical and change of distance to the user's pupils.

In other words, since the "correct" image as a video signal, codes in a bus, etc. exists on the corresponding display input, registration of the real image by appropriate devices at every instant allows determining the difference and compensate it also using standard tools, primarily algorithmic ones, since the proposed solution already contains data processing means.

Further, video surveillance means may include a tilt sensor of the floating craft, whereas the data processing means may be configured to display shapes, images and/or letters changing their apparent angular position with a predetermined adjustable phase shift relative to change of the angular position of the floating craft. This facilitates reading of the information from the display screen during roll, as the image can "track" roll of the floating craft and appear to be motionless to the user, whereas the user may customize this effect.

The human organism, being in difficult conditions for the vestibular apparatus, simultaneously uses three stabilization systems: vestibular apparatus, system of visual binding to supporting points and muscular system. Specificity of balancing on a swimming board is that there are no good natural informative and effective reference points to maintain the equilibrium of the second system (as the water is too homogeneous and fluid and the board is quite movable). If the user is inexperienced, his/her third system is at the same time overloaded by the task to continuously control muscles. A good solution in this situation would be to create special supporting signals for the visual control system that could be easily used by the user's brain to create a new control loop using such signals with some prediction elements—and assist the vestibular apparatus. The present invention also solves this problem by creating easy-to-view marks or by appropriately placing and moving already existing elements of the image (including information texts, frames, windows, etc.) on the display.

Thus, the data processing means may be configured to display elements that come in motion due to change of the angular position of the floating craft.

In addition, the motion of mentioned elements on the display may be accompanied with an image shift proportional to the rate of change of the floating craft angular position. This allows the user, especially a beginner, to balance better on the floating craft while simultaneously focusing on reading the information from the display.

Furthermore, the data processing means may be configured to recognize objects and output the information about them onto the display, wherein the information is stored in the data processing unit or received from external sources.

The data processing means may also be configured to recognize dangerous objects and dangerous situations and give priority to the display of these alerts. Furthermore, the data processing means may be configured to automatically exchange the data about dangers with the Coast Guard and/or similar information devices located in the region.

It should be noted that the hardware and corresponding algorithms for recognition, interruption for display of priority messages and autonomous data exchange are widely known. However, none of them have been used in the above configuration, in spite of the fact that precisely this application provides the desirable effect discussed above.

In addition, the floating craft may also be equipped with devices for observing the surrounding space, and the data processing means may be configured to simultaneously display a conditionally fixed plane and the surrounding space.

A conditionally fixed plane is fixed relative to the user, which facilitates not only reading the information, but also maintaining the balance. In this case observation devices provide an overview of the course and the space under the floating craft and monitor the position of the user's pupils in order to track changes and keep the said plane as a horizon level indicator.

Further, video surveillance means may be located on the floating craft surface facing the water and provided with illumination. This ensures the opportunity to travel and observe the space around and under the floating craft in the dark, as well as in colored or turbid water. Furthermore, observation means of the floating craft may include a locator which may be configured as an acoustic sounder with ability of information exchange.

The floating craft may also be equipped with one or more video cameras which face the user and/or are located on a support and/or pulled in tow behind the floating craft and connected to receivers and/or data processing units, configured to analyze the user's health condition and, in case of its worsening, signal an alarm and transmit it to the Coast Guard and other floating craft, if accessible.

Receivers and data processing means of the floating craft may be configured to duplicate the information from an external device at the whole display or its part at least in one of operation modes. In other words, the floating craft can communicate with similar devices located nearby and with the Coast Guard, like any known mobile communication device. For example, if the data processing means receiving the information from a video camera facing the user, from a tilt sensor of the floating craft, or from a pulse meter and pressure gauge on the user's wrist that transmits the diagnostic information to receivers about the user, it can go out to the information exchange with concerned recipients, even without the user's participation.

It is clear from the above that the display with relevant information exchange devices and data processing means installed on the floating craft may be configured and used as a protected and the closest to the user substitute of an expensive and less protected gadget which has to be hidden in a sealed and inaccessible place or, perhaps, left on the beach. At the same time, receivers and data processing means are configured to duplicate (repeat) the information from an external device (gadget, personal computer, etc.) on the whole display or its part at least in one of operation modes.

It also follows from the above that the proposed apparatus may be substantially considered, implemented and used as a gadget, a monitor, a display with some additional functions, the main one of which is ability to move on the water surface, while performing normal operation, including non-stop video monitoring and reading of the information from the display.

BRIEF DESCRIPTION OF THE DRAWINGS

FIGS. 1 and 2 show, respectively, a top view and a sectional view of a surfboard with an information display.

Figure 3:
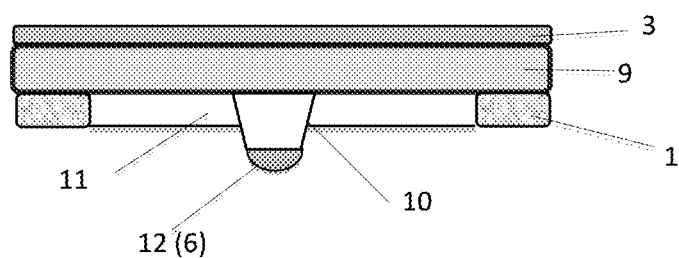
FIG. 3 shows the structure section.

On surfboard 1 the user's footprints are marked 2 on FIG. 1. Display 3 is placed at the front end of the surfboard 1. As shown on FIG. 2, the surface of the surfboard 1 over the display 3 may be covered with a transparent layer 4 that insulates the display 3 and other electronic components such as a group of primary converters 5, video recorder 6 and controller 7. The arrows indicate the directions of information transmission.

The group of primary converters 5 may include an external data receiver (GPS, internet connection, SMS messages, weather information, etc.), water and air temperature sensors, wind power sensors, accelerometers and tilt sensors registering rolls of the surfboard, a depth sounder, etc. At the same time, the external data receiver forms receiving means, while sensing devices, including the video recorder 6, form the video surveillance means. If the further processing of information from receiving and/or video surveillance means is necessary, this is performed by controller 7 forming the data processing means of the apparatus.

Thus, a minimum set of resources located at the floating craft is a video surveillance means and an information display 3 which is configured to receive images, data, etc., for example, supplemented with a modem and a video controller, i.e. with standard units which ensure implementation of this function in any tablet, laptop and PC, wherein the display 3 faces the user. In addition to the display 3 there is a surveillance unit, namely a video recorder 6, on the floating craft surface which faces the water.

The fullest version of the floating craft also includes the group of primary converters 5 and the controller 7. Mark 8 denotes a display perimeter, when it is in the form of the floating craft.

On FIG. 2 the "direction" of the video recorder 6 and the display 3 is indicated by an arrow respectively down and up to the observer. Certainly, the video recorder 6 may be configured to be able to rotatable and to tilt.

A photo or video camera may be used as the video recorder 6, whereas the controller 7 may be configured for data processing: filtering, forming an "image", arbitrating and therefore setting priority for outputting of the information on the display. Observing objects through the water layer is possible due to the fact that the digital image processing based on the known algorithms (see, for example, I. S. Gruzman et al., Digital Image Processing in Information Systems: Novosibirsk, NGTU Publishing House, 2002-352 p.) in combination with a mobile information device, allows reaching two goals. First, it gives the possibility to observe the bottom and objects underwater very clearly, tune out the noise, clean field of vision, and adjust the contrast, brightness and saturation of image. Second, it allows tuning out distortions induced by irregular composition of the aquatic environment and air gap, when the information device moves through the water or when it is removed out of the water (in the user's hands).

Moreover, application of well-known algorithms for smoothing sharp changes or irregularities on the display surface helps to eliminate short-term impacts of drops or a thin water layer on the display, while use of a feedback loop from a tilt sensor to a data processing and storage means allows the application of known algorithms for stabilization of the image position or its details on the display.

Image recognition algorithms offer good opportunities to explore the underwater flora and fauna. For example, a tourist floating on a SUP (stand up paddle) board in a tropical shallow sea may receive not only information about names of fish swimming underneath, but also the information about their habits, uniqueness or, on the contrary, distribution in other regions; whereas a child on such a floating craft may get to know in which fairy tales they are mentioned. In addition, the function of retaining the processed image and the zoom function allow scrutinizing details of objects with desired magnification and even creating a collection of such images both for later viewing and for sharing via interface channels with similar devices located nearby in real time.

Finally, speaking about possibilities for fixing the display housing on the surface of the floating craft, we refer to different kinds of grips, fixtures, "velcro", which would allow fixing the housing reliably on the surfboard or the bottom of the boat, so that the display would be always in front of the user's eyes, leaving his/her hands free.

Of course, all the blocks and elements, all electronics located on the floating craft are powered by a power supply (battery) mounted thereon, they are made watertight and equipped with an appropriate interface for the described connection, data transmission and processing and described algorithms' implementation. Note also that all described algorithms are widely applied to mobile devices, and their implementation does not require development of new tools and approaches.

In comparison with a known solution, that is with a passive monitoring mode, the above described apparatus allows increasing the volume of data perceived by the user and effectiveness of perception, as well as filtering, selecting and providing the information which was previously simply lost in part due to turbidity of the water under the floating craft, short-term appearance of the objects, water waves and periodic covering of the surface of the floating craft with a layer of water, rolls of the floating craft, etc. In the proposed apparatus, the controller 7 may be configured to apply the standard image filtering methods, eliminating vibrations, etc. which are widely applied in photo and video recorders.

Thus, the user looking on the display 3 (8) or perceiving a sound command outgoing therefrom, (the display 3 may be equipped with speakers that are connected to the corresponding outputs of the controller 7), may also receive an alarm which is the result of processing of external information, data from various sensors and video signal. For example, alarms may signal a nearby shark, reef or nets, or an approaching hurricane.

Practical tasks (like displaying water area maps with user's position, weather forecast, information from the Coast Guard, etc.) do not exclude aesthetic purposes and interactive exchange—the live image may contain ornament, paintings, photos of friends, etc.

The display 3 (FIG. 3) is mounted in the housing 9. Mark 10 denotes a support mounted in the window 11 of the surfboard 1, where a video camera 12 is placed.

Figure 4:
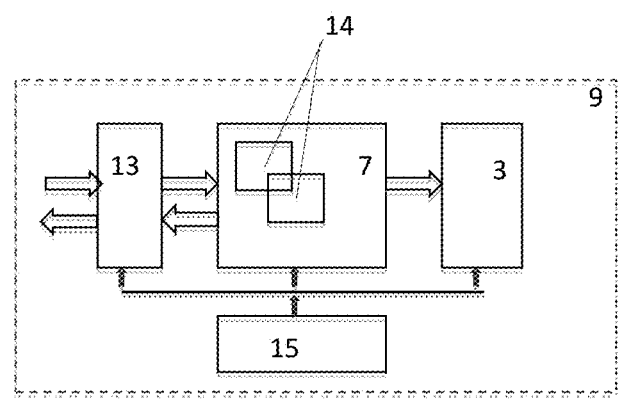
FIG. 4 shows the block diagram of the electronics.

The controller 7 (FIG. 4) is placed in the housing 9 together with the display 3 and the communication interface 13 with external devices for receiving and transmitting information from outside sources and communicating with sensors not incorporated in the controller 7. The blocks included in its composition, such as RAM and ROM, video controller, etc., are marked as 14. Finally, mark 15 indicates a power supply which is connected via power supply buses to the units 7, 3, 13, etc.

Figure 5:
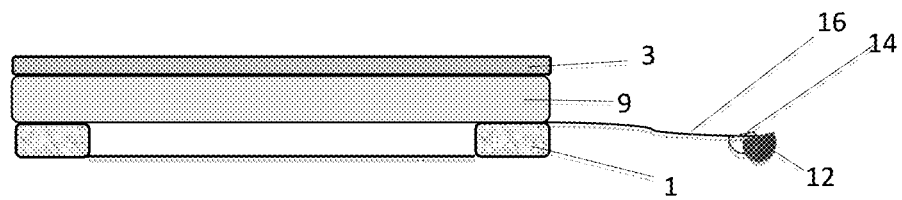
FIG. 5 is a particular embodiment.

FIG. 5 shows embodiment in which the video camera 12 is towed behind the housing 9 by means of flexible connection 16 that comprises an insulated cable of power supply and data exchange for the video camera 12 and a light source 14.

Figure 6:
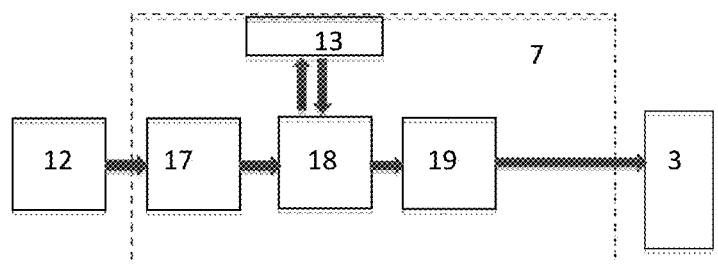
FIG. 6 shows the block diagram (algorithm) of distortion compensations etc.

FIG. 6 represents the block diagram (algorithm) for distortion compensation, object recognition and output of information about objects on the display 3. The image from the video camera 12 goes through the filter in an image processing means 17 (which stores and analyses related images to clear them from "image suspension"—small image particles regularly distributed and immovable in water—discovers and compensates irregularity on the field due to difference in composition and temperature of water layers, etc.; well-known image processing algorithms may be applied for this purpose). Then the cleared image goes to the recognition means 18 that may be connected via the interface 13 to external data devices or additional devices included in the controller 7 so that the data stored in the unit 18, the controller 7 and the Internet allow the unit 18 to recognize objects and representatives of flora and fauna, prescribe their names and useful details, discover hazards and send all received data to the unit 19 which forms images for the screen and show them on the display 3 in a manner convenient for the user.

If the video camera 12 is supplemented with a locator (a sonar, not shown on drawings), when analyzing dangerous situations, the information from the sonar about a distance and a closing speed to obstacles, swimmers, sea lions, etc. is also taken into account. In addition, the locator may be acoustic, that is include a sound or ultrasound emitter and receiver which can transmit and receive information, for example, by means of signal modulation, if they are connected to the data processing and storage controller 7. Such data exchange may be performed with similar information devices as well as other units, and even with representatives of marine fauna (e.g., the emitter can deter sharks).

Clearly, when particularly dangerous objects like poisonous fish or sharks are detected, the display 3 shows an alarm and the Coast Guard is alerted. This happens according to the algorithm described above which comprises recognition in the unit 18, data exchange with the Coast Guard and external information sources via the interface 13, prioritization and generation of messages (including audio messages, and output of data on the display 3 also implies sending a corresponding signal to speakers of the floating craft) and data transmission to the unit 19 and via this unit to the display 3.

The same algorithms and block diagrams may be applied in the floating craft to compensate distortions arising from water drops or layer on the display surface, deflection of the vertical and distance changes to the user's pupils. Let us consider them in succession.

If the housing 9 with the display 3, or just the display 3, is fixed on the surfboard 1 (swimming board), water drops or waves can temporarily cover the display 3. Such local or short-time obstacles to transparency introduce some local or short-time image distortions which can be filtered by the unit 17 by means of comparing close in time or location images and deleting any local and short-time changes.

Figure 7:
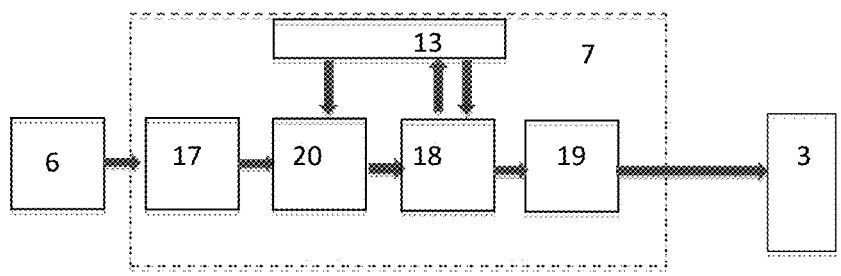
FIG. 7 shows the block diagram (algorithm) of compensation of tilts, roll, distance to the eyes.

To compensate inclination, rolling, distance to the eyes, we may use a tilt sensor mounted in the housing 9 and connected via the interface 13 to a compensation unit 18 (FIG. 7) and a distance-to-user's-eyes sensor of the display 3 mounted in the plane of the display 3 and also connected to the unit 20 via the interface 13. By increasing the distance, this unit can scale (zoom) images to facilitate reading of the information when the distance between the user's eyes and the display 3 surface increases (this is particularly important for text information). Similarly, if a tilt appears, the direction cosines in the unit 20 are altered in counterphase for those image areas of the display 3 which are required for support of the quasi-horizontal plane.

Sound and ultrasonic emitters and receivers can provide not only for the active sonar system, but also for alarm and underwater communication with similar devices (means). In addition, some representatives of the underwater fauna react to ultrasounds of appropriate range and duration, and this fact may also be used.

Being on water involves a range of hazards for a person not only from outside, but also due to his/her own health condition and behavior. That is why in addition to standard methods of human interaction with the device (via menus, gestures, voice communication, etc.) it would be useful if the floating craft could analyze the dynamics of user's movements, facial gestures and oculomotor activity when they are in sight of the video camera facing the user (not shown on drawings). This analysis allows making conclusions about the user's health condition, adequacy, panic attack, etc. Surely, these methods do not exclude simultaneous use of information from a variety of physiological parameter sensors placed on the user's body (as a bracelet, glued patch, modules embedded in a swimming costume, etc.) and connected via interfaces with the information device and, via the interface 13, to the controller 7 configured with ability of analysis of user's condition. For this purpose the controller employs the algorithm of comparing data received from sensors with normal human reference data (or normal user's reference data). This solution allows performing higher quality monitoring of the user's health condition to ensure greater safety in critical situations.

Figure 8:
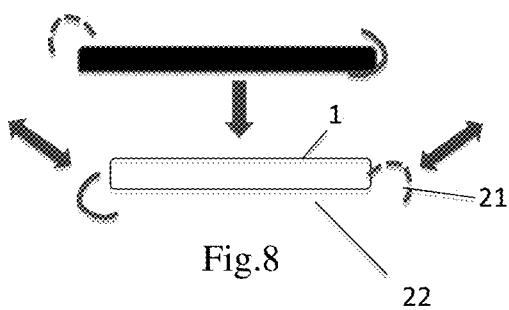
FIG. 8 shows an embodiment of a spring-loaded gripper.

Finally, as it has already been noted, the housing 9 can be fixed to the surface of the floating craft using various types of clamps, spring-loaded grippers or holders. FIG. 8 presents an example of the spring-loaded gripper. The user withdraws spring-loaded grippers 21 arranged on the housing 9 (retracted position of grippers 19 is shown as a dashed line), then lowers them onto the surface 22 of the surfboard 1 (swimming board) and releases grippers 21 which are pushed by the spring into their working position (shown by a solid line). The swimming board may have a layout and a hole for the video camera 12.

As it is supposed that the floating craft may be also used in high waves and shallow waters where low-frequency radio waves can penetrate, it is reasonable to use a short-interface console for providing stable communication in difficult conditions. For example, it may be either made as an adapter for gadgets left on the beach or as a floating buoy converting signals into standard Wi-Fi and other frequencies.

It is also important to emphasize that the present invention implies not only the independent implementations mentioned above, in the summary, and in examples, but also all possible combinations thereof.

Important possible application of the display 3 (8) is an implementation in which the transmitted image serves for training purposes and/or facilitates use of a surfboard. In the latter case we mean not only various instructions and training videos for use of a surfboard, but more practical aspects as well: use of dynamic image to facilitate balancing on a board such as, for example, visual information about navigation course, an image or indication of rolls, accelerations in rowing, etc., and also interactive communication between a beginner and the swimming board when various instructions are reproduced according to results of the user's failures—a kind of "trainer" on board. The video camera with a processor which is directed at the sportsman can be useful here, if recommendations about the correct way of training and technical aspects of exercises are provided according to results of image processing by the local device (or in the remote center). In addition, as it has already been mentioned, the display 8 can also show the optimal (correct) position of the user's feet, as well as recommended movement for a better balance on the surfboard.

As mentioned above, specificity of use of swimming boards in clear water allows the sportsman to see the image on the display clearly, even if the board is covered by a wave, etc. In all these cases the important fact is that it is not very comfortable to use conventional gadgets simultaneously for a sportsman holding a paddle or making some movements to balance on the board. Such devices as eye-glasses projecting the image into the eyes, etc., are not always suitable for water recreation. That is why an image, or a part thereof, should be transmitted on the display 3 from other gadgets of the sportsman (such as a smartphone, a variety of fitness bracelets, watches, etc.). Furthermore, the controller 7 may be configured to manipulate an image by voice control, remote control or gestures (standard scrolling movement by hand, other movements, for example, of the head or body parts) recognized by the processor according to the information from video cameras or other sensors.

In addition, interactive communication between users of such devices is possible. Such communication can be performed between them and with the outside world. In particular, the image may be transmitted from another user of a swimming board (for example, an invitation with a photo or video clip from an inviting person with indication of mutual coordinates and distances on the water area).

And finally, the crucial difference of the claimed apparatus is, as noted above, the ability to process an image, including, for example, the ability to correct distortions induced by water on the surface using a camera or a set of built-in cameras or ultrasonic transducers or IR sensors or using information from ingress water sensors, water speed sensors or other data about finding of a part or entire image under an uneven water layer—and using the built-in device processor it is possible to adjust a live image so that its distortions induced by water cover (waves passed over) appear to be minimal to an observer. The other effective way is to analyze an image from an external camera (for example, attached to a paddle, a life jacket or other gear of the sportsman) and compare it with regard to the original projection angles and carry out the appropriate corrections based on the said comparison. Another way is to analyze changes in the image of the sportsman, the paddle, etc. in the field of sight of built-in cameras of the surfboard 1 and to make inverse calculations of optical distortions for a transmitted image for the following appropriate correction based on said analysis. The second method is less efficient for water drops and local pollution, but it does not require additional remote cameras.

In other words, the claimed solution makes it possible to adjust the live image during movement to compensate optical distortions induced by water on the surface of the surfboard 1.

Of interest is the implementation when the image is as if it coincided with the horizontal surface of the water, and the screen (display) 3 of the surfboard 1 is as if it was a window, possibly a moving window through which the image is seen. Then, in the case of getting some practical information the image can move according to the roll sensor information which solves the problem of drops and dirt which hinder, for example, reading—it is enough to sway a little to move the image and thereby improve perception of visual information by separating it from contamination. In this case the image appears to be moving and being under control of information from sensors of roll, rotation and other movement of the swimming board (surfboard).

In the other mode a real (from cameras), or information-synthesized image about depths and bottom surface, can be transmitted on the display 3 (8) of the surfboard 1. Such image changes are in synchrony with the movement of the surfboard 1 on the water, which is achieved by placing video cameras, light sources as well as sonars on hangers at the desirable depth. It creates the effect of "transparent surfboard". Moreover, filtering and enhancing the contrast of underwater images, along with correction of geometric distortions, provide the picture which is much more acceptable than the picture through a simple glass window with a light source in the swimming board. Of course, the ZOOM function is not excluded and should operate on request. Image correction against water flooding or splashing onto the display 3 surface may be also applied simultaneously.

In addition, the synthesized image may be combined with the real one: for example, the bottom relief and deep-seated archaeological objects may be graphically synthesized and displayed according to the current GPS-coordinates, while flora, fauna and divers sailing under the surfboard may be displayed as an overlay of this processed real image from the video cameras. It is also reasonable that the image obtained from the depth for the sportsman on the surface (surfer) is adjusted by distance which eliminates the impact of the high coefficient of water refraction. In this case the user's vision does not have to adapt, and the distance to underwater objects can be perceived adequately (as well as above the surface). A picture from a quadcopter camera or camera of other aircraft representing the top view of the water area with associated data about location of other surfers, high sea wave motion, etc. may also be also transmitted on a separate additional display window.

Thus, the claimed floating craft with its large information capacity may be used not only for the exploring purposes like "a window" to the underwater world, but it can also work with security functions that appear to be potentially useful and convenient for both sportsmen and tourists.

The invention claimed is:

1. A swimming board comprising a flat surface which faces a user for providing foot support to a user while the user is standing on the flat surface, characterized in that an information display is mounted in a central zone of the flat surface, wherein the central zone is the zone in which the user maintains balance while the swimming board is in motion, the information display enables the user to maintain balance on the swimming board and view the information display while the swimming board is in motion, the swimming board includes a tilt sensor, the flat surface of the swimming board and the surface of the information display are covered with a transparent insulating layer, said information display is configured to display information from an underwater video recorder or video camera attached to the swimming board in order to survey underwater objects and means for transmitting images from the video camera or video recorder to the information display, wherein information from a tilt sensor provided on the swimming board enables images to be stabilized in a horizontal plane so a user may view the flat surface of the swimming board and simultaneously observe underwater objects without shifting sight.

2. The swimming board according to claim 1, characterized in that the video recorder or video camera and data processing means are configured to compensate image distortions on the display induced by water on the screen or deflection of the vertical or change of the distance to the user's sight.

3. The swimming board according to claim 1, characterized in that the video recorder or video camera and tilt sensor and data processing means are configured to output images and/or inscriptions on the display which alter their apparent angular position with a predefined adjustable phase shift relative to the change of the angular position of the swimming board.

4. The swimming board according to claim 1, characterized in that data processing means are configured to display image elements which commence movement when the angular position of the swimming board is changed.

5. The swimming board according to claim 1, characterized in that the display additionally displays an image shift which is proportional to a rate of change of the angular position of the swimming board.

6. The swimming board according to claim 1, characterized in that data processing means are configured to recognize objects and output the information about them on the display, when the information is stored in the data processing means or received from external sources.

7. The swimming board according to claim 1, characterized in that data processing means are configured to recognize dangerous objects and situations and to provide priority display alerts upon recognition of such dangerous objects and situations.

8. The swimming board according to claim 1, characterized in that data processing means are configured to automatically exchange data about dangers with the Coast Guard and/or other third parties located in a region of the swimming board.

9. The swimming board according to claim 1, characterized in that the video recorder and video camera are configured to monitor the surface above the water, and data processing means are configured to simultaneously display a conditionally fixed plane and the surface above the water.

10. The swimming board according to claim 1, characterized in that the video recorder and video camera are located on the swimming board surface which faces the water and the swimming board is provided with an illumination source.

11. The swimming board according to claim 1, characterized in that the video recorder and camera is mounted on the side of the swimming board and facing the user, and the swimming board is connected to receiving and/or processing means which are configured to analyze a user's health condition and generate an alarm in the event of the worsening of the user's health condition and transmit this alarm to the Coast Guard and other surrounding associated floating crafts.

12. The swimming board according to claim 1, characterized in that data receiving and processing means are configured to duplicate information from an external device at the information display or a part of the information display.

13. A swimming board according to claim 1, characterized in that means of transmitting image are also configured to receive and transmit to the display information and messages from the Internet.

14. A swimming board according to claim 1, characterized in that a perimeter of the display and a perimeter of the floating craft coincide so that the shape of the display replicates the shape of the floating craft, but reduced in size.

15. A swimming board according to claim 1, characterized in that the means of transmitting image from the video camera or video recorder to the display is connected in series to an image processing means, an image recognition means, a first input of a forming unit and an interface, and wherein the video camera or video recorder output is connected to the input of image processing means, and a second input of the forming unit is connected to an output of the interface and output of the forming unit is connected to an input of the display.

* * * * *